United States Patent
Lin

[11] 3,816,235
[45] June 11, 1974

[54] GLASS FIBER SIZE COMPOSITION
[75] Inventor: Kingso C. Lin, Newark, Ohio
[73] Assignee: Owens-Corning Fiberglas Corporation, Toledo, Ohio
[22] Filed: Aug. 18, 1972
[21] Appl. No.: 281,685

[52] U.S. Cl. ............ 161/175, 117/126 GB, 161/93, 161/144, 260/29.7 NR, 260/827
[51] Int. Cl. ......................................... D06m 11/00
[58] Field of Search ............ 161/93, 143, 144, 203, 161/175; 260/29.7 R, 29.7 NR, 827; 117/126 GB

[56] References Cited
UNITED STATES PATENTS

| | | | |
|---|---|---|---|
| 2,744,835 | 5/1956 | Caroselli | 117/72 |
| 3,424,608 | 1/1969 | Marzocchi et al. | 117/126 GB |
| 3,567,671 | 3/1971 | Janetos et al. | 260/28.5 |
| 3,676,287 | 7/1972 | Flautt et al. | 161/140 |

Primary Examiner—George F. Lesmes
Assistant Examiner—James J. Bell
Attorney, Agent, or Firm—Staelin & Overman; Keith V. Rockey

[57] ABSTRACT

This invention is addressed to an improved size composition for use in the treatment of glass fibers in the manufacture of glass fiber textiles, glass fiber reinforced plastics and glass fiber reinforced elastomeric products wherein the size is formulated to contain, as the essential components, a water-soluble resin formed of maleic anhydride and a conjugated diene, an alkyl acrylate or methacrylate, or a vinyl aromatic monomer, and a glass fiber anchoring agent. Bundles of glass fibers sized with the composition of the invention are particularly well suited for impregnation with an elastomer compatible material containing a resorcinol-aldehyde resin component and an elastomer component for use in the manufacture of glass fiber reinforced elastomeric products.

24 Claims, 5 Drawing Figures

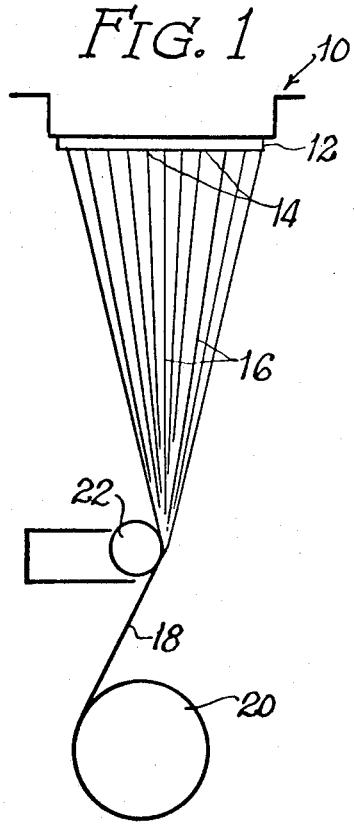
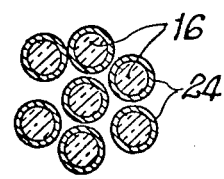
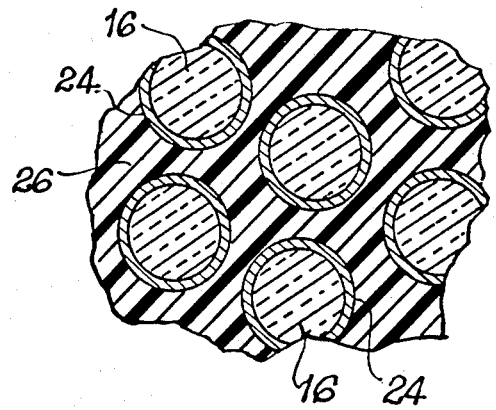
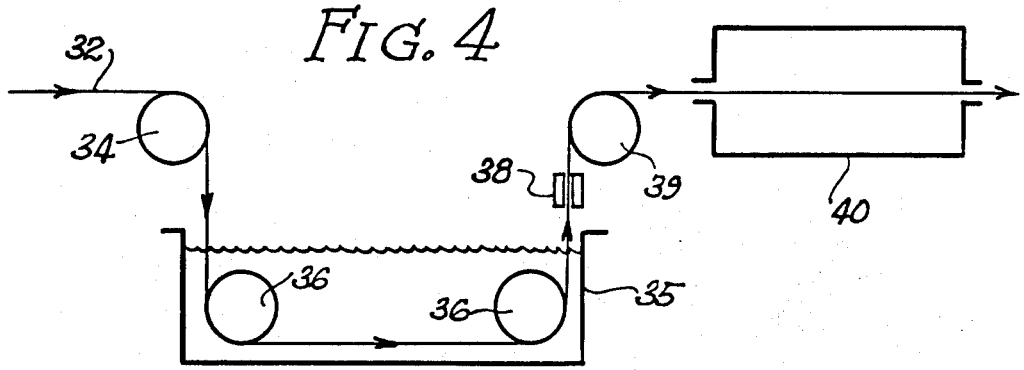
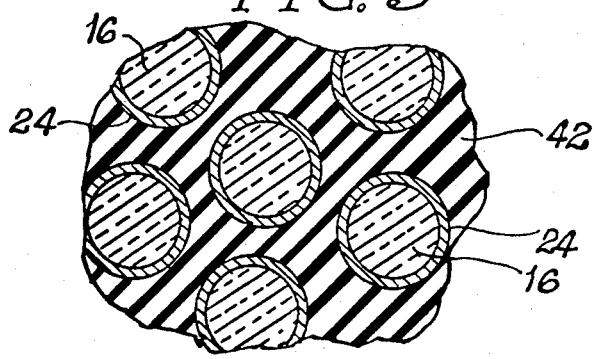

GLASS FIBER SIZE COMPOSITION

This invention relates to a size composition, and more particularly to a size composition for application to glass fibers to improve the processing and performance characteristics of glass fibers in glass fiber textiles, in the manufacture of glass fiber-reinforced elastomeric products and in the manufacture of glass fiber-reinforced plastics.

It is conventional practice in the manufacture of glass fibers to coat the glass fibers, preferably as they are formed, with a size composition to impart to the individual glass fibers the desired degree of lubricity without destroying the fibrous characteristics of the glass fibers. The thin film or size coating applied to the individual glass fiber surfaces serves to protect the fibers from destruction from mutual abrasion as the glass fibers are subjected to subsequent processing, such as in the formation of woven or non-woven fabrics or in the combination of the treated glass fibers with elastomeric and plastic materials in the manufacture of glass fiber-reinforced elastomeric and plastic products.

To the present, the chemical compositions of the sizes used in the treatment of glass fibers have depended, for the most part, on the intended use of the treated glass fibers. For example, if the treated glass fibers are to be used in the manufacture of glass fiber textiles, the size is preferably one which imparts good hand and feel to the fabric.

When the glass fibers are to be used as reinforcement for elastomeric products as in the manufacture of glass fiber-reinforced drive belts, tires and the like, the size composition is one which is compatible with, and serves to improve the bonding relationship of the glass fibers with, elastomeric materials. As is now well known to the art, the difficulties in bonding glass fibers to elastomeric materials are believed to stem in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems in bonding glass fibers to elastomeric materials as described above and to promote a secure bonding relationship between glass fibers and elastomeric materials, the glass fibers are sized, preferably as they are formed, with an elastomer compatible size and are then formed into strands, yarns, cords or fabrics, generally known to the art as bundles, and impregnated with a composition containing an elastomer component to intertie the glass fiber surfaces to the elastomeric material. Thus, the size composition is preferably one which is capable of establishing a bonding relationship with the impregnant to facilitate integration of the impregnated bundle with elastomeric materials.

When the treated glass fibers are for use as reinforcement for resins, such as polyepoxide, polyester, polyamide, melamine, urea or phenolic aldehyde resins and the like, the size composition is preferably one which is compatible with such resinous systems and which is capable of establishing a secure bonding relationship with such resins.

Because of the different considerations inherent in textiles, glass fiber-reinforced elastomeric products and glass fiber-reinforced plastics, different size compositions which are specific to the intended use of the treated glass fibers have been employed. However, such size compositions are generally formulated to include a film-forming component which operates to form a thin coating or film on the glass fiber surfaces and thereby serve as a binder for the components of the size. High molecular weight resins, in the form of aqueous dispersions or emulsions, have been used in glass fiber size compositions as described in U.S. Pat. No. 3,206,623, and are quite effective as film-forming components. However, because such materials are resinous, water soluble forms of such resins are generally not available, with the result that the emulsion or dispersion forming the size composition tends to be somewhat unstable over extended periods of use.

Water soluble film formers, such as polyvinyl alcohol, have also been used in glass fiber size compositions. However, the resulting film which is formed from compositions embodying such water-soluble materials, lacks the desired toughness to withstand mutual abrasion of the glass fibers under some conditions, and is otherwise incapable of imparting to the sized glass fibers significantly improved physical properties such as increased tensile strength.

It accordingly is an object of the present invention to provide a composition for use in the treatment of glass fibers to improve the processing and performance characteristics of the glass fibers in the manufacture of glass fiber textiles and fabrics, in the manufacture of glass fiber-reinforced elastomeric products and in the manufacture of glass fiber-reinforced resins.

It is a related object of the invention to provide a composition for use in the treatment of glass fibers to provide a more secure bonding relationship between the treated glass fibers and elastomeric materials and resins with which the glass fibers are combined in the manufacture of glass fiber-reinforced elastomeric products and glass fiber-reinforced resinous products.

It is a more specific object of the present invention to provide a composition for use in the treatment of glass fibers as a size which is formulated to include a water-soluble, resinous film forming component capable of forming a tough film on the glass fiber surfaces.

It is another object of the invention to provide treated glass fibers which can be used in the manufacture of textiles and glass fiber-reinforced elastomeric and plastic products.

These and other objects and advantages of the invention will appear more fully hereinafter and, for purposes of illustration and not of limitation, embodiments of the invention are shown in the accompanying drawing in which:

FIG. 1 is a flow diagram showing the manufacture of continuous glass fibers and the treatment thereof as the glass fibers are formed to form a thin film or size coating on the individual glass fiber filaments to improve the processing and performance characteristics in accordance with the concepts of the invention;

FIG. 2 is a cross-sectional view of glass fibers processed in accordance with the diagram of FIG. 1;

FIG. 3 is a cross-sectional view of glass fibers treated in accordance with the present invention as a reinforcement for resins;

FIG. 4 is a flow diagram illustrating the treatment of glass fibers processed in accordance with the diagram of FIG. 1 subsequent to their being formed into bundles in the manufacture of glass fiber-reinforced elastomeric products; and FIG. 5 is a cross-sectional view of a bundle of glass fibers treated in accordance with the diagram of FIG. 4.

The concepts of the present invention reside in a composition for treatment of glass fibers to form a thin film or coating on the individual glass fiber filaments in which the composition is formulated to contain a water-soluble, resinous film-forming polymer and a glass fiber anchoring agent, and preferably a mixture of two or more anchoring agents.

In the practice of this invention, the composition is formulated to include a resinous copolymer of maleic anhydride and an unsaturated monomer selected from the group consisting of a conjugated diene, an alkyl acrylate or methacrylate in which the alkyl group contains one to six carbon atoms and a vinyl aromatic monomer in which the resin is soluble in aqueous media.

Representative unsaturated monomers for use in forming the resinous copolymers employed in the practice of the present invention include butadiene, isoprene, chloroprene, 2,3-dichlorobutadiene, 1,3-pentadiene, 2,3-dimethyl butadiene, 2,4-hexadiene, cyclopentadiene, chloro-substituted cyclopentadienes, cyclooctadiene, methyl acrylate, ethyl acrylate, propyl acrylate, methyl methacrylate, ethyl methacrylate, isopropyl methacrylate, styrene, alpha-methylstyrene, alpha-chlorostyrene, etc.

The copolymers employed in the practice of the present invention are resinous, that is, they have average molecular weights of greater than 2,000, and preferably greater than 5,000. The relative proportions of the maleic anhydride and the unsaturated monomer are not critical to the practice of the invention; the copolymers should contain a sufficient amount of the maleic anhydride to render the copolymer soluble in aqueous alkaline media. Generally, such copolymers contain 30 to 75 mole percent of maleic anhydride although it is preferred that such copolymers contain equal molar proportions of the maleic anhydride and the unsaturated monomer.

As indicated, the resinous copolymers employed in the practice of the present invention are soluble in aqueous alkaline media; however, they may be hydrolyzed in water to form an aqueous acidic solution. Therefore, the pH of the size composition of this invention can be on both the acidic and the alkaline side and preferably in the range of 4–10. The pH can conventionally be adjusted by adding a base, such as an alkali metal hydroxide, ammonium hydroxide, organic base (e.g., pyridine, primary and secondary amines, etc.) to the composition to adjust the pH to the desired level.

The resins employed in the practice of this invention are commercially available in the form of solids and aqueous solutions which can be simply blended with the other components of the size composition in the preparation of the size embodying the features of this invention. For example, copolymers of maleic anhydride and butadiene are commercially available under the trade name "Maldene" from Marbon Chemical Co., a division of Borg-Warner. Other copolymers formed of maleic anhydride with unsaturated monomers are available from GAF Corporation under the trademark "Gantrez."

The size composition of the invention is formulated to include at least one glass fiber anchoring agent in the form of an organo silicon compound.

As the organo silicon coupling agent, use can be made of a very wide variety of silicon containing coupling agents known to those skilled in the art to be useful for this purpose. In general, suitable organo silicon compounds include organo silanes containing one to three readily hydrolyzable groups, such as halogen (bromine, chlorine, fluorine or iodine) or alkoxy having one to six carbon atoms, such as methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes, and hence the anchoring agent is present in the aqueous size composition of the invention as the silane, silanol and/or siloxane.

The organic group or groups attached to the silicon atom can be any of a variety of groups including alkyl having 1–10 carbon atoms, such as methyl, ethyl, propyl, hexyl, etc.; alkenyl containing 2–8 carbon atoms, such as vinyl, allyl, etc.; cycloalkyl having 4–8 carbon atoms, such as cyclopentyl, cyclohexyl, etc.; aryl containing 6–15 carbon atoms, such as phenyl, naphthyl, benzyl, etc., and the halogen, amino, hydroxy, mercapto, glycidoxy or epoxy substituted derivatives thereof. It will be understood that wherein the organo silane contains more than one organic group, the various organic groups attached to the silicon atom can be the same or different from each other.

Representative of the compounds falling within the above group are ethyldichlorosilane, propyltrichlorosilane, n-butyl-trimethoxysilane, gamma-aminopropyltrimethoxysilane, delta-aminobutyltriethoxysilane, bis-(gamma-aminopropyl)dimethoxysilane, delta-aminobutylethyldimethoxysilane, beta-hydroxyethyltriethoxysilane, glycidoxypropyltrimethoxysilane, gamma-chloropropyl-trichlorosilane, vinyldichlorosilane, gamma-aminoallytrimethoxysilane, beta-aminovinyltriethoxysilane, 3,4-epoxycyclohexyltrimethoxysilane, 3-aminocyclohexylethyltriethoxysilane, paraaminophenyltriethoxysilane, methacryloxypropyltrimethoxysilane, N-(beta-aminoethyl)-gamma-aminopropyltrimethoxysilane, gamma-mercaptopropyltriethoxysilane, gamma-hydropropyltrimethoxysilane, as well as a variety of others. In general, those silanes preferred are those in which at least one organic group is substituted by at least one amino group.

One particularly preferred amino-substituted organic silane which has been found to provide excellent results in the practice of the present invention is a polyfunctional amino-substituted compound having the formula:

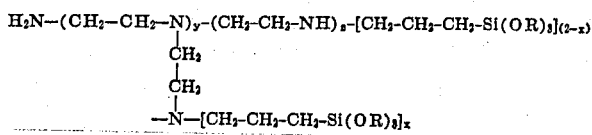

wherein R is lower alkyl (e.g., methyl, ethyl, propyl), x is an integer between 0 and 2, and y and z are integers. Compounds of the foregoing type are available from Dow Corning Corporation under the trademark Z-6050.

It has been found that certain combinations of the foregoing organo silicon compounds in the composition of this invention provide unexpected superior results in the manufacture of glass fiber-reinforced elastomeric products. It is particularly advantageous to employ a combination of the poly-functional amino-substituted compound designated Z-6050 with an amino-substituted alkyl silane of the formula $$H_2N - (CH_2)_w - SiZ_3$$

where w is an integer from 2 to 5 and Z is a readily hydrolyzable group as described above. Preferred is gamma-aminopropyltriethoxy silane.

Another combination of anchoring agents which have been found to provide good results in this invention is a substantially equimolar mixture of $$H_2N - CH_2 - CH_2 - NH - CH_2 - CH_2 - CH_2 SiZ_3$$

and an alkyl silane, such as methyltriethoxy silane. This mixture is available from Dow Corning under the trademark "XZ 85475."

While not essential to the practice of the invention, the size composition is preferably formulated to include an emulsifying agent to promote the overall stability of the composition. Without limiting the invention as to theory, it is believed that the presence of an emulsifying agent provides improved compatibility between the aqueous resin solution and the anchoring agents.

A wide variety of conventional emulsifying agents can be used in the practice of the invention. Preferred are the nonionic emulsifying agents, such as polyethylene glycol, the polyoxyethylene derivatives of fatty acid partial esters of sorbitol anhydrides or the polyoxyethylene derivatives of fatty alcohols containing eight to 22 carbon atoms or of alkyl substituted phenols wherein the alkyl group contains six to 20 carbon atoms. Such emulsifying agents are commercially available and include the "Tween" and the "Span" emulsifying agents from Atlas Chemical Industries, Inc., the "Carbowax" emulsifying agents from Union Carbide, and the "Triton" series of emulsifiers from Rohm & Haas. The "Tween" series includes ethoxylated fatty acid esters of sorbitan, such as "Tween 60" which is a polyoxyethylene derivative of the stearate ester of sorbitan, "Tween 80" which is a polyoxyethylene derivative of the trioleate ester of sorbitan; the "Span" series includes the fatty acid esters of sorbitan, such As "Span 85" which is the trioleate ester of sorbitan. The "Carbowax" series are polyethylene glycols of molecular weights up to about 6,000.

As will be appreciated by those skilled in the art, anionic and cationic emulsifying agents can also be used in the practice of the invention. Representative of such emulsifying agents are the alkali metal fatty acid sulfates (e.g. sodium lauryl sulfate), alkali metal salts of alkyl aryl sulfonates (e.g. sodium alkyl benzene sulfonates) as well as numerous others.

The relative proportions of the resinous copolymer and anchoring agent in the composition of this invention are not critical and can be varied within wide limits. It is generally preferred that the copolymer component range from 5 to 60 percent by weight of the composition on a dry basis, and preferably 20 to 35 percent by weight. The amount of emulsifying agent, when employed, should be an amount sufficient to provide a stable system. It has been found that an amount within the range of 5 to 30 percent by weight on a dry or water-free basis is generally sufficient.

The total amount of anchoring agent can similarly be varied within wide ranges. Usually, an amount within the range of 5 to 60 percent, and preferably 20 to 50 percent, by weight on a dry or waterfree basis is sufficient. When use is made of two or more anchoring agents, each is employed in a weight ratio of within the range of 1/3 to 3 based on the weight of each of the other anchoring agents.

The composition of the invention can be applied to glass fibers as they are formed, or after forming if desired, to form a thin film or coating on the individual glass fiber filaments. The resinous copolymer operates as a film former on the glass fiber surfaces and is anchored thereto by means of the anchoring agent or agents described above. It has been found that the coated glass fibers are completely compatible with and can be securely bonded to elastomeric materials in the manufacture of glass fiber-reinforced elastomeric products and to plastic resins in the manufacture of glass fiber-reinforced plastics.

The size composition of the present invention is quite stable and can be stored over long periods of time if desired. The stability of the composition can be further improved by adding thereto a gel agent to adjust the viscosity to a desired level, preferably a viscosity of 50 to 800 cps. The gel agent renders the composition thixotropic and thus provides the additional advantage of maintaining the composition on the glass fiber surfaces as the glass fibers are randomly whipped during the forming process.

As the gel agent, use can be made of a wide variety of materials having thixotropic properties. For this purpose, use is preferably made of gel agents formed of cellulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1–4 carbon atoms, including methyl, ethyl, propyl, etc. As indicated above, use can also be made of lower alkylene glycol ethers of cellulose and methyl cellulose wherein the glycol forming the ether contains 2–4 carbon atoms, including ethylene glycol, propylene glycol and butylene glycol. Representative of suitable cellulose and cellulose derivatives include dimethyl ether of cellulose, ethylene glycol ethers of cellulose, such as hydroxyethyl cellulose marketed by Dow Chemical Company under the trademark XD 1300, propylene glycol ethers of methyl cellulose, which are marketed by Dow Chemical Company under the trade name Methocel HG, methyl cellulose, which is marketed by Dow under the trade name Methocel MC, and butylene glycol ethers of methyl cellulose which are marketed by Dow under the trade name Methocel HB. In addition to the cellulose-type gel agents described above, use can also be made of various other gel agents such as the cross-linked polyacrylamides marketed by Dow Chemical Company under the designation "SA 1300."

The amount of gel agent is not critical and is an amount sufficient to adjust the viscosity to within the desired range. An amount of gel agent within the range of 5 to 25 percent by weight is generally sufficient.

Having described the basic concepts of the present invention, reference is now made to the following examples which are provided by way of illustration and not by way of limitation, of the practice of the invention in formulating the composition of the invention and the treatment of glass fibers in accordance with the invention.

EXAMPLE 1

An aqueous solution of a resinous copolymer of equal molar amounts of maleic anhydride and butadiene (Maldene 286 from Marbon Chemicals, a division of Borg-Warner) containing about 25 percent by weight of the resin is formulated into the following composition:

|  | Parts by wt. |
|---|---|
| Maleic anhydride-butadiene resin solution (25% resin) | 138 |
| Gamma-aminopropyltriethoxysilane | 40 |
| Emulsifying agent (Span 85) | 20 |

Water constitutes the balance of the composition; the amount of water is adjusted to provide a solids content of the composition of about 2 percent by weight. The pH of the solution is about 8.8.

The above composition can be applied to glass fibers, preferably as a size as the glass fibers are being formed, or after a previously applied size has been removed.

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with the composition of Example 1 as they are gathered together to form a strand 18. For this purpose, use is made of an applicator 22 which is illustrated as a roller that is constantly wet with the forming size composition. The filaments of glass are each wet with the size composition as they are gathered together to form the strand 18 that is wound about the drum 20.

The sized strand 18 is allowed to air dry, but drying of the size coating can be accelerated by subjecting the strand to dielectric, microwave, hot gas or radiant drying.

As shown in FIG. 2 of the drawing, the composition forms a very thin coating or film 24 on the individual surfaces of the glass fiber filaments to provide glass fibers having the desired lubricity without destroying the fibrous characteristics or appearance of the glass fibers 16.

The strand 18 of the sized fibers can be processed directly into textile fabrics or can be combined with plastic resins in the manufacture of glass fiber reinforced plastics. When used in the manufacture of glass fiber-reinforced elastomeric products, the strand 18 is preferably plied with other strands and twisted to form yarns, threads or cords which may be used as reinforcement, with or without cutting to shorter lengths, and which can be formed into woven or non-woven fabrics for subsequent combination with elastomeric materials.

EXAMPLE 2

This example illustrates a size composition embodying a glass fiber lubricant.

Using the procedure described in Example 1, a maleic anhydride-butadiene copolymer resin (Maldene 286) including a glass fiber lubricant is formulated into the following:

|  | Parts by wt. |
|---|---|
| Maleic anhydride-butadiene copolymer resin solution (25% resin) | 100.0 |
| Emulsifying agent (Tween 85) | 20.0 |
| Gamma-aminopropyltrimethoxysilane | 20.0 |
| Polyamino silane (Z-6050) | 8.0 |
| Lubricant (sulfonated mineral oil, Twitchell 7440 from Emery Chemicals) | 13.5 |

The balance of the composition is water which is present in an amount to adjust the solids content to within the range of 0.5 to 5 percent by weight. The composition of Example 2 can be applied to form a thin film coating in accordance with the procedure described in Example 1 in an amount sufficient to provide a dry coating constituting from 0.01 to 10 percent by weight of the fibers.

As desired, a wide variety of glass fiber lubricants can be used in accordance with the concepts of the present invention as illustrated in Example 2. Glass fiber lubricants are well known to those skilled in the art and include fatty acid amines containing 8–36 carbon atoms, such as lauryl amine, stearyl amine, palmityl amine, etc., solubilizable mineral oils, such as sulfonated mineral oils marketed by Emery (e.g., Twitchell 7440), polyalkylene glycols, such as polyethylene glycol or polypropylene glycol having average molecular weights from 400 to 6,000 or higher (e.g. Carbowax 4000), and amides prepared by the reaction of a fatty acid containing 8–36 carbon atoms, such as lauric acid, palmitic acid, oleic acid, linoleic acid with poly(polyoxyethylene) amines. Another lubricant which can be used in the present invention is an amide formed by the reaction of one of the fatty acids mentioned above with a polyamine having the formula:

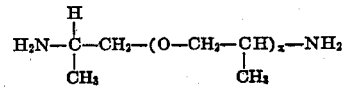

wherein $x$ is an integer. Suitable amines of this type are marketed by Jefferson Chemical and have average molecular weights ranging up to about 2,000. The reaction between the fatty acid and the polyamine can be conveniently carried out by admixing the amine with the acid in a molar ratio of at least 2 moles of acid per mole of amine, and heating the mixture to a temperature between 50°–100° C. However, it will be understood by those skilled in the art that a wide variety of other glass fiber lubricants in addition to those specifically described above can be used in accordance with the concepts of the present invention. Similarly, it is possible, and sometimes desirable, to use mixtures of the foregoing lubricants where use is made of a lubricant.

The lubricant can be employed in varying amounts. Best results are usually obtained where the composition contains, on a dry or water-free basis, from 1 to 20 percent by weight of one or more lubricants.

Additional size compositions embodying the concepts of the invention are as follows:

EXAMPLE 3

| | Parts by wt. |
|---|---|
| Maleic anhydride-butadiene copolymer resin | 25 |
| Gel agent (Methocel HG 90) | 15 |
| Gamma-aminopropyltrimethoxysilane | 32 |
| Emulsifying agent (Tween 85) | 5 |
| Emulsifying agent (Span 85) | 15 |

EXAMPLE 4

| | Parts by wt. |
|---|---|
| Maleic anhydride-butadiene copolymer resin | 25 |
| Gel agent (Methocel HG 90) | 14 |
| Polyamino silicon compound (Z 6050) | 5 |
| Gamma-aminopropyltriethoxysilane | 15 |
| Lubricant (Twitchell 7440) | 16 |
| Lubricant (Carbowax 4000) | 5 |
| Emulsifying agent (Tween 85) | 17 |

EXAMPLE 5

| | Parts by wt. |
|---|---|
| Maleic anhydride-isoprene copolymer resin (1:1 molar ratio) | 30 |
| Lubricant (Twitchell 7440) | 15 |
| Emulsifying agent (Span 85M) | 20 |
| Polyamino silicon anchoring agent (Z 6050) | 8 |
| Delta-aminobutyltriethoxysilane | 30 |

EXAMPLE 6

| | Parts by wt. |
|---|---|
| Maleic anhydride-chloroprene copolymer resin (molar ratio of 1:1) | 30 |
| Anchoring agent (XZ 85475) | 20 |
| Gel agent (Methocel HG 90) | 15 |
| Emulsifying agent (Tween 85) | 20 |

EXAMPLE 7

| | Parts by wt. |
|---|---|
| Maleic anhydride-styrene copolymer resin (molar ratio of 1.5:1) | 25 |
| Lubricant (Twitchell 7440) | 10 |
| Gel agent (Methocel HG 90) | 15 |
| Vinyltrimethoxysilane | 30 |
| Emulsifying agent | 15 |

EXAMPLE 8

| | Parts by wt. |
|---|---|
| Maleic anhydride-methylacrylate copolymer resin (molar ratio of 1:1) | 30 |
| Gamma-glycidoxypropyltrimethoxysilane | 15 |
| Emulsifying agent (Tween 80) | 15 |
| Gel agent (Methocel HB) | 20 |

EXAMPLE 9

| | Parts by wt. |
|---|---|
| Maleic anhydride-cyclooctadiene copolymer resin (molar ratio 1:1) | 30 |
| Gamma-methacryloxypropyltrimethoxysilane | 20 |
| Emulsifying agent | 18 |

Each of the compositions of Examples 3 to 9 is prepared and used in the treatment of glass fibers in accordance with the procedure described in Example 1. Water constitutes the balance of each composition and is present in an amount sufficient to provide the desired solids content.

The glass fibers treated with the compositions of Examples 1 to 9 can be used in the formation of textiles, such as woven and non-woven fabrics, in accordance with conventional processing techniques. Alternatively, the fibers treated with one of the compositions of Example 1 to 9 can be directly combined with plastic resins in the manufacture of glass fiber reinforced plastics, laminates, coated fabrics and the like. The thin film coating of the invention on the surfaces of the individual glass fiber filaments operates to securely anchor the glass fibers to the plastic resin. A cross-sectional view of a laminate embodying glass fibers treated with a composition of this invention is shown in FIG. 3 of the drawing. The glass fibers 16 having the thin coating 24 formed from the composition of the invention are distributed through a plastic resin 26 constituting a continuous phase.

In the preferred use, glass fibers which have been treated in accordance with the present invention are employed as reinforcement for elastomeric materials in the manufacture of glass fiber-reinforced elastomeric products such as tires, drive belts, V-belts, etc. Glass fibers having a size coating thereon embodying the concepts of this invention can be combined directly with elastomeric materials without further processing whereby the coating formed of the maleic anhydride-unsaturated monomer copolymer resin and the anchoring agent serves to securely bond the glass fiber surfaces to the elastomeric material. However, it is frequently preferred to form the fibers treated with the size composition of this invention into cords formed of two or more strands of sized fibers which have been plied and twisted together, yarns, threads or fabrics, referred to as bundles, and subject the bundles of sized fibers to impregnation with an elastomer compatible material.

It has been found in accordance with a further concept of the invention that the size composition of this invention is particularly effective in promoting a strong bonding relationship with elastomeric materials in the manufacture of glass fiber reinforced elastomeric materials where bundles of glass fibers which have been sized with the composition of the invention are impregnated with the impregnating composition described in copending application Ser. No. 230,723 filed Mar. 1, 1972. The impregnating composition described in this copending application is formulated to include, as essential components, a resorcinol-aldehyde resin, a vinyl pyridine-butadiene-styrene terpolymer, a microcrystalline parraffin wax and a dicarboxylated butadiene-styrene copolymer resin.

This concept of the invention may be illustrated by the following examples:

EXAMPLE 10

Using the procedure described in the above application, an impregnating composition is formulated as follows:

Impregnating Composition

| | Total parts by weight |
|---|---|
| Resorcinol-formaldehyde resin latex (Penacolite R 2170 - 75% solids) | 48 |
| Vinyl pyridine-butadiene-styrene terpolymer latex (Gentac FS - 42% solids) | 900 |
| Dicarboxylated butadiene-styrene resin (Pliolite 4121 - 50% solids) | 350 |
| Microcrystalline paraffin wax (Vultex Wax Emulsion No. 5 - 56% solids) | 100 |
| Water | 832 |

Impregnation with the aqueous composition of Example 10 can be carried out by way of any of a variety of known techniques for the impregnation of glass fiber bundles. Referring specifically to FIG. 4 of the drawing, a bundle 32 formed of a plurality of glass fibers which have been sized with one of the compositions of Examples 1 to 9 is passed over a guide roller 34 for passage downwardly into an impregnating bath 35 containing the aqueous impregnating composition of Example 10. The bundle is then passed under a pair of rollers 36 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 38 which operates to remove excess treating composition from the bundle and to work the treating composition into the bundle. Thereafter, the endless bundle is advanced over roller 39 into a drying oven 40, such as a dielectric, microwave, hot gas, or radiant oven maintained at a temperature above ambient temperature, and preferably a temperature within the range of 65°–180° F to accelerate removal of the aqueous diluent and to set the impregnant in situ in the glass fiber bundle. Drying will occur within a relatively short period of time, generally within 0.1 sec. to 10 min., depending upon the temperature of drying.

The resulting bundle is shown in cross-section in FIG. 5 of the drawing. As can be seen from this figure, the bundle is formed of a plurality of glass fibers 16 which have the size coating 24 formed from one of the components of Examples 1 to 9 on the surfaces of the individual filaments. The impregnant 42 in the form of the solids from the treating composition of Example 10 completely penetrates the bundle and serves to separate the glass fibers each from the other to form a unitary bundle structure.

The relative proportions of the components of the impregnating composition of Example 10 can be varied within wide limits; preferred proportions are set forth in the following general example:

EXAMPLE 11

| | Parts by weight solids |
|---|---|
| Resorcinol-formaldehyde resin | 2 – 10 |
| Butadiene-styrene vinyl pyridine terpolymer | 20 – 60 |
| Dicarboxylated butadiene-styrene resin | 15 – 40 |
| Microcrystalline paraffin wax | 3 – 30 |

The balance of the foregoing composition is water and the amount of water is adjusted to provide a solids content within the range of 20 to 55 percent by weight. Application of the impregnating composition is usually made in an amount sufficient to deposit in the sized fiber bundle dry solids constituting from 10 to 25 percent by weight of the fiber system.

While not equivalent to the compositions of Examples 10 and 11, use can be made of other impregnating compositions known to those skilled in the art. Such compositions are generally formulated to contain two to 10 parts by weight of a resorcinol-aldehyde resin component and 20 to 60 parts by weight of at least one elastomer component. For a further description of such compositions, reference can be made to U.S. Pat. Nos. 3,567,671 and 3,591,357.

Other impregnating compositions formulated to contain a resorcinol-aldehyde resin component and an elastomer component are illustrated by way of the following examples:

EXAMPLE 12

Using the procedure described in U.S. Pat. No. 3,567,671, an impregnating composition is formulated as follows:

| | Parts by weight (solids) |
|---|---|
| Resorcinol-formaldehyde resin | 6.0 |
| Vinyl pyridine-butadiene-styrene terpolymer | 30.0 |
| Vinyl chloride-vinylidene chloride copolymer (Dow latex 874) | 20.0 |
| Microcrystalline paraffin wax | 6.0 |

EXAMPLE 13

An impregnating composition is formulated in accordance with the following:

| | Parts by weight (solids) |
|---|---|
| Resorcinol-formaldehyde resin | 2 to 10 |
| Butadiene-styrene rubber | 20 to 60 |

EXAMPLE 14

An impregnating composition is formulated in accordance with the following:

| | Parts by weight (solids) |
|---|---|
| Resorcinol-formaldehyde resin | 2 to 10 |
| Vinyl pyridine-butadiene-styrene terpolymer | 20 to 60 |

Water constitutes the balance of the compositions of Example 12 to 14, and is present in an amount to provide the desired solids content. The composition can be used to impregnate bundles of glass fibers which have previously been sized with a composition illustrated by those of Examples 1 to 9 in accordance with the procedure described in Example 10.

In facilitating the combination of glass fibers treated in accordance with the present invention with elastomeric materials, the individual glass fibers containing a coating on the surfaces thereof from Examples 1 to 9 or bundles of glass fibers sized with one of the compositions of Examples 1 to 9 and impregnated as described above are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

I claim:

1. Glass fibers having a thin coating on the surfaces thereof, said coating comprising a resin formed of a copolymer comprising an aqueous solution of a resin formed of a copolymer of maleic anhydride and an unsaturated monomer selected from the group consisting of a conjugated diene, an alkyl acrylate, an alkyl methacrylate and a vinyl aromatic monomer, and a glass fiber anchoring agent selected from the group consisting of an organo silane containing 1 to 3 readily hydrolyzable groups and containing at least one organic group attached directly to the silicon atom, the corresponding silanols and polysiloxanes.

2. Glass fibers as defined in claim 1 wherein the anchoring agent is a mixture of a polyamino silicon compound of the formula

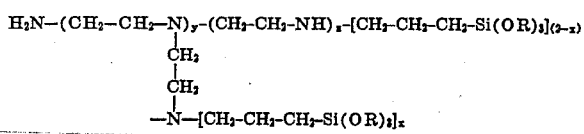

wherein R is lower alkyl, x is an integer between 0 and 2 and y and z are integers and an aminoalkyl silane.

3. Glass fibers as defined in claim 1 wherein the copolymer constitutes from 5 to 60 percent of the coating and the anchoring agent constitutes from 5 to 60 percent of the coating.

4. Glass fibers as defined in claim 1 wherein the coating includes a glass fiber lubricant.

5. Glass fibers as defined in claim 1 wherein the unsaturated monomer is a conjugated diene.

6. Glass fibers as defined in claim 1 wherein the anchoring agent is gamma-aminopropyltriethoxy silane.

7. Glass fibers as defined in claim 1 in the form of a fabric.

8. A glass fiber bundle comprising a plurality of glass fibers, each of the glass fibers having a thin coating on the surfaces thereof comprising a resin formed of a copolymer comprising an aqueous solution of a resin formed of a copolymer of maleic anhydride and an unsaturated monomer selected from the group consisting of a conjugated diene, an alkyl acrylate, an alkyl methacrylate and a vinyl aromatic monomer, a glass fiber anchoring agent selected from the group consisting of an organo silane containing one to three readily hydrolyzable groups and containing at least one organic group attached directly to the silicon atom, the corresponding silanols and polysiloxanes, and an impregnant in the bundle, said impregnant comprising an elastomer compatible material.

9. A glass fiber bundle as defined in claim 8 wherein the anchoring agent is a mixture of a polyamino silicon compound of the formula

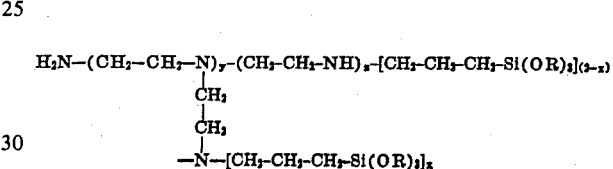

wherein R is lower alkyl, x is an integer between 0 and 2, and y and z are integers, and an aminoalkyl silane.

10. A glass fiber bundle as defined in claim 8 wherein the copolymer constitutes from 5 to 60 percent of the coating and the anchoring agent constitutes from 5 to 60 percent of the coating.

11. A glass fiber bundle as defined in claim 8 wherein the anchoring agent is gamma-aminopropyltriethoxy silane.

12. A glass fiber bundle as defined in claim 8 wherein the unsaturated monomer is a conjugated diene.

13. A glass fiber bundle as defined in claim 8 wherein the elastomer compatible material is a mixture of a resorcinol-aldehyde resin and an elastomer.

14. A glass fiber bundle as defined in claim 8 wherein the elastomer compatible material is a mixture of a resorcinol-aldehyde resin, a vinyl pyridine-butadiene-styrene terpolymer, a microcrystalline wax and a dicarboxylated butadiene-styrene resin.

15. A glass fiber bundle as defined in claim 8 wherein the glass fibers are in the form of a strand.

16. A glass fiber bundle as defined in claim 8 wherein the glass fibers are in the form of strands which have been plied and twisted together.

17. In a glass fiber-reinforced elastomeric product in which an elastomeric material constitutes a continuous phase in which the glass fibers are distributed, the improvement in the bonding relationship between the glass fibers and the elastomeric material constituting a continuous phase comprising a coating on the individual glass fiber surfaces comprising a resin formed of a copolymer comprising an aqueous alkaline solution of a water soluble resin formed of a copolymer of maleic anhydride and an unsaturated monomer selected from the group consisting of a conjugated diene, an alkyl acrylate, an alkyl methacrylate and a vinyl aromatic monomer, and a glass fiber anchoring agent selected from the group consisting of an organo silane containing one to three readily hydrolyzable groups and containing at least one organic group attached directly to the silicon atom, the corresponding silanols and polysiloxanes.

18. A product as defined in claim 17 wherein the anchoring agent is a mixture of a polyamino silicon compound of the formula

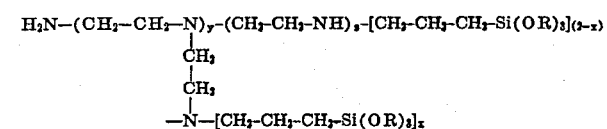

wherein R is lower alkyl, $x$ is an integer between 0 and 2 and $y$ and $z$ are integers, and an aminoalkyl silane.

19. A product as defined in claim 17 wherein the anchoring agent is gamma-aminopropyltriethoxysilane.

20. A product as defined in claim 17 wherein the unsaturated monomer is a conjugated diene.

21. A product as defined in claim 17 wherein the glass fibers are in the form of a bundle, and the bundle includes an impregnant therein comprising an elastomer compatible material.

22. A product as defined in claim 21 wherein the elastomer compatible material is a mixture of a resorcinol-aldehyde resin and an elastomer.

23. A product as defined in claim 21 wherein the elastomer compatible material is a mixture of a resorcinol-aldehyde resin, a vinyl pyridine-butadiene-styrene terpolymer, a microcrystalline wax and a dicarboxylated butadiene-styrene resin.

24. A product as defined in claim 21 wherein the glass fibers are in the form of strands which have been plied and twisted together.

* * * * *